United States Patent [19]

Moteki et al.

[11] Patent Number: 4,731,401
[45] Date of Patent: Mar. 15, 1988

[54] POLYOLEFIN RESIN COMPOSITION CONTAINING ROSIN, ROSIN DERIVATIVE OR PETROLEUM RESIN

[75] Inventors: Tsutomu Moteki, Sodegaura; Kazuo Aoki, Chibashi; Kazuhiro Kimura, Ichiharashi, all of Japan

[73] Assignee: Chisso Corporation, Osaka, Japan

[21] Appl. No.: 915,078

[22] Filed: Oct. 3, 1986

[30] Foreign Application Priority Data

Oct. 21, 1985 [JP] Japan .................. 60-234872

[51] Int. Cl.$^4$ .................. C08K 11/00; C08J 23/00; C08L 45/00
[52] U.S. Cl. .................. 524/271; 524/9; 524/13; 524/499; 525/210; 525/211; 525/240
[58] Field of Search .................. 525/240, 210, 211; 524/271, 499, 13, 9

[56] References Cited

U.S. PATENT DOCUMENTS

| | | | |
|---|---|---|---|
| 3,484,405 | 12/1969 | Seto | 525/210 |
| 3,630,980 | 12/1971 | Russell | 524/271 |
| 3,652,725 | 3/1972 | Diaz et al. | 525/95 |
| 3,850,858 | 11/1974 | Park | 524/271 |
| 3,862,068 | 1/1975 | Russell | 524/271 |
| 3,878,143 | 4/1975 | Baumann et al. | 524/13 |
| 3,932,327 | 1/1976 | Naylor | 524/271 |
| 3,970,623 | 7/1976 | Feeney et al. | 525/210 |
| 3,993,826 | 11/1976 | Butler et al. | 525/240 |
| 4,067,938 | 1/1978 | Jack | 264/41 |
| 4,111,860 | 9/1978 | Jack | 521/84 |
| 4,191,719 | 3/1980 | Jack | 264/41 |

*Primary Examiner*—Harold D. Anderson
*Assistant Examiner*—Dennis R. Daley
*Attorney, Agent, or Firm*—Fred Philpitt

[57] ABSTRACT

A polyolefin resin composition comprising a polyolefin resin and, blended therewith, (A) 10 to 40 wt % of a styrene type resin and (B) 0.5 to wt % of one or more members selected from among rosin, derivatives of rosin and petroleum resins is provided. This composition is excellent in adhesion to a cast foamed polyurethane, etc. and capable of forming a molding product with a low molding shrinkage.

9 Claims, No Drawings

POLYOLEFIN RESIN COMPOSITION CONTAINING ROSIN, ROSIN DERIVATIVE OR PETROLEUM RESIN

The present invention relates to a polyolefin composition. More specifically, the invention relates to a polyolefin resin composition excellent in adhesion to a cast foamed polyurethane, etc., and capable of forming a molding product with a low molding shrinkage.

Polyolefin resins are excellent in not only processability but also various physical properties including resistances to impact, abrasion, chemicals, thermal deformation, and creep. Moreover, since they are inexpensive, they are widely used in fields involving household electric appliances, automotive parts, and packaging materials.

However, since a polyolefin resin is non-polar in moleculr structure and has a crystalline structure, it is poor in adhesivity. For example, unless an exclusive adhesive is used, it has not been able to be adhered to a cast foamed polyurethane. Further, a high molding shrinkage of the resin has been a cause of a defect that a molding product formed therefrom is liable to be unstable in size and liable to generate strain. With a view to obviating defects as mentioned above, there have heretofore been made various proposals, which have, however, provided no satisfactory results. For example a modified polyolefin resin prepared by modifying a polyolefin resin with an unsaturated carboxylic acid such as maleic anhydride or acrylic acid has been proposed for improving the adhesivity. However, resultant material shows no substantial adhesion to a cast foamed polyurethane, and has achieved no improvement in molding shrinkage. On the other hand, there has been known a method comprising blending a polyolefin resin with any one of various fillers with a view to improving the molding shrinkage. Although this method has surely achieved an improvement in the molding shrinkage, no improvement in the adhesion to a cast foamed polyurethane has been attained.

We, the inventors of the present invention have made intensive investigations with a view to solving the abovementioned problems involved in conventional polyolefin resin compositions. As a result, it has been found that improvements in the adhesion to a cast foamed polyurethane and the molding shrinkage can be attained by a polyolefin resin composition prepared by blending a polyolefin resin with a specific amount of (A) styrene type resin, and (B) a member or a mixture of two or more members selected from among rosin, derivatives of rosin, and petroleum resins; or a polyolefin resin composition prepared by further blending the above-mentioned polyolefin resin composition with a specific amount of a filler. The present invention has been completed based on this finding.

As will be apparent from the above description, an object of the present invention is to provide a polyolefin resin composition improved in adhesion and molding shrinkage.

In accordance with the present invention, there are provided:

(1) a polyolefin resin composition comprising a polyolefin resin, and, blended therewith, (A) 10 to 40 wt. % of a styrene type resin and (B) 0.5 to 5 wt. % of one or more members selected from among rosin, derivatives of rosin, and petroleum resins; and (2) a polyolefin resin composition comprising a polyolefin resin, and, blended therewith,
(A) 10 to 40 wt. % of a styrene type resin, (B) 0.5 to 5 wt. % of one or more members selected from among rosin, derivatives of rosin, and petroleum resins, and (C) 5 to 40 wt. % of a filler.

Polyolefin resins usable in the present invention include polypropylene type polymers, polyethylene type polymers, modified polyolefin polymers prepared by graft-polymerization of a polyolefin of the kind as mentioned above with an unsaturated acid or its anhydride, and mixtures thereof. Polypropylene type polymers as mentioned herein include a propylene homopolymer; crystalline copolymers comprising propylene units as the main component and units of one or more α-olefins selected from among ethylene, butene-1, 4-methylpentene-1, hexene-1, heptene-1, octene-1, and decene-1; and mixtures thereof. Polyethylene type polymers as mentioned herein include an ethylene homopolymer; crystalline copolymers comprising ethylene units as the main component and units of one or more α-olefins selected from among propylene, butene-1, 4-methylpentene-1, hexene-1, heptene-1, octene-1, and decene-1; and mixtures of the above-mentioned polymers. The fluidity index of a polyolefin resin to be used [expressed in terms of melt flow rate (grams of molten resin extruded at a temperature of 230° C. under a load of 2.16 Kg for 10 min.) in the case of a polypropylene type polymer, and melt index (grams of molten resin extruded at a temperature of 190° C. under a load of 2.16 Kg for 10 min.) in the case of a polyethylene type polymer] may differ in optimum value, depending on the processing method. In general, the fluidity index is preferably 3 to 80 g/10 min. in the case of injection molding, 0.1 to 10 g/10 min. in the case of sheet molding, blow molding or profile extrustion molding, and 1 to 20 g/10 min. in the case of film extrusion molding.

Styrene type resins usable in the present invention include polystyrene, acrylonitrile-butadiene-styrene copolymers (ABS resins) acrylonitrile-styrene copolymers (AS resins), styrene-methyl methacrylate copolymers, rubber-blended polystyrene (HI polystyrene), styrene-maleic anhydride copolymers, and mixtures thereof. The amount of the styrene type resin to be blended is 10 to 40 wt. %, preferably 15 to 35 wt. %. When the amount is smaller than 10 wt. %, improvements in adhesion and shrinkage are small. When it exceeds 40 wt. %, delamination is liable to occur, the tensile strength of the weld of a molding product obtained by injection molding is markedly decreased, and the solvent resistance is also lowered. Thus, the features characteristic of a polyolefin resin unfavorably cannot be maintained. Although the fluidity of a styrene type resin to be used is not particularly limited, choice of a styrene type resin having a fluidity close to that of a polyolefin resin to be used is preferred.

Rosin that may be used in the present invention is represented by one prepared by removing volatile turpentine oil from pine resin by steam distillation. Derivatives of rosin such as hydrogenated rosin, disproportionated rosin, rosin glycerin ester, and maleic acid-modified rosin can be used in the present invention. A petroleum resin that may be used in the present invention is a resin prepared by polymerizing, in the presence of a catalyst, an unsaturated hydrocarbon mixture obtained in oil refining or oil cracking, and having a softening point of about 60 to 120° C. and physical properties close to those of rosin or its derivatives. The amount of rosin, a derivative of rosin, a petroleum resin, or a mixture thereof to be blended is 0.5 to 5 wt. %, preferably 1 to 4 wt. %. When it is smaller than 0.5 wt. %, the effect of providing a compatibility of the polyolefin resin with the styrene type resin is poor. When it exceeds 5 wt. %, the solvent resistance of the composition is unfavorably decreased so that the features characteristic of the polyolefin resin cannot be maintained.

Fillers usable in the present invention include inorganic fillers such as talc, calcium carbonate, barium sulfate, calcium silicate, calcium sulfate, aluminum hydroxide, magnesium hydroxide, mica, metal powders, and metal fibers; and organic fillers such as wooden powders, chaff powders, a cellulose staple fiber, and synthetic staple fibers. They may be used either alone or in mixture. The amount of the filler to be blended is 5 to 40 wt. %, preferably 10 to 35 wt. %. When the amount is smaller than 5 wt. % the synergistic effect of the filler with the styrene type resin on improvements in adhesion and molding shrinkage is small. When it exceeds 40 wt. %, the impact resistance of the molding product formed, is decreased, and the tensile strength of the weld of a molding product formed by the injection molding method is decreased, thus bringing about unfavorable practical problems. As for the form of the filler, an inorganic filler preferably has a particle size of about 30 μm or smaller, while an organic filler such as a wooden powder preferably has a particle size allowing the filler to pas through 60-mesh sieve. A fiber filler is desirably one cut to a fiber length of about 5 mm from the viewpoint of handling.

Among synthetic fibers, the use of any one of those having substantially the same melting point as that of the polyolefin resin or a liability to decomposition at a temperature not exceeding the melting point of the polyolefin resin are desirably avoided.

Other additive components usable in the composition of the present invention include varieties of stabilizers, colorants, lubricants, nucleators, antistatic agents, coupling agents, plasticizers, and synthetic rubbers.

Although the composition of the present invention may be molded by directly feeding to a molding machine a mixture prepared by mixing predetermined amounts of blending components constituting the composition of the present invention with a mixer having a high speed stirrer, such as a Henschel mixer (trade name) or a supermixer, the general procedure comprises preliminarily kneading a mixture as mentioned above in a customary kneading apparatus such as rolls, a Banbury mixer, an extruder, and feeding the resulting kneaded pellets to any one of various molding machines to effect molding.

The composition of the present invention is very excellent in adhesion to a cast foamed polyurethane. The adhesion is favorably further improved when the surface of a molding product formed from the composition of the present invention is preliminarily surface-treated before casting and foaming a polyurethane by a generally known method of treatment such as a flame treatment, a corona discharge treatment, or a plasma treatment. The treatment is preferably effected so as to provide a surface tension of 35 dynes/cm or higher.

Besides the application needing adhering to a cast foamed polyurethane, the composition of the present invention can be suitably used in applications needing coating or printing.

In an instance of application of the composition of the present invention, a polyurethane is cast and foamed in a portion of a molding product formed using the composition of the present invention according to the injection molding method to adhere the foamed polyurethane to the portion of the molding product, whereby a molding having good heat insulating properties and structural strength is obtained. Such a molding product can be suitably employed as a part of a household electric appliance or an automotive part. In another instance, a sheet formed from the composition of the present invention may be thermally formed into a predetermined structure by the vacuum forming method or the pressure forming method, and a polyurethane is cast and foamed in a portion of the resulting forming product to adhere the foamed polyurethane to the forming product, whereby apart of a household electric appliance or an automotive part having good heat insulating properties and structural strength can also be obtained. Further, the composition of the present invention can be employed in a multi-layer structure product prepared by laminating the same with other material.

The composition of the present invention is very excellent in adhesion particularly to a cast foamed polyurethane, and has a low molding shrinkage. It can be suitably used as a molding material in various molding methods such as the injection molding method, the extrusion molding method, and the blow molding method for production of various moldings including parts of household electric appliances and automotive parts.

The following Examples and Comparative Examples will specifically illustrate the present invention, but should not be construed as limiting the scope of the invention.

In Examples and Comparative Examples, various tests were carried out according to the following methods.

(a) Measurement of Fluidity Index

It was carried out in accordance with JIS K 6758 for polypropylene type resins, JIS K 6760 for polyethylene type resins, JIS K 6870 for styrene type resins, and JIS K 7210 for ABS resins.

(b) Evaluation for Adhesion to Cast Foamed Polyurethane 92 parts by weight of a polyether polyol (DRN-1049) manufactured by Mitsui Nisso Urethane K.K. and 100 parts by weight of an isocyanate (MR-200, mixed with Freon) manufactured by Nippon Polyurethane Kogyo K.K. were placed in a mixer, and mixed by stirring with an agitating blade rotating at 3,500 rpm for 12 seconds. The resulting mixture was cast and foamed in a box-like molding product of 200 mm in width, 150 mm in length, 100 mm in depth, and 1.5 mm in wall thickness which was heated at 40° C. After completion of foaming, the resulting composite was allowed to stand for 10 minutes, and examined by manual peeling with respect to adhesion of the molding product to the foamed polyurethane, followed by judgement in accordance with the following criteria:

◎: complete adhesion of molding product to foamed polyurethane

○: tolerable adhesion of molding product to foamed polyurethane with some insufficiently adherent portions Δ: weak and partial adhesion of molding product to foamed polyurethane x: no adhesion of molding product to foamed polyurethane (c) Molding Shrinkage A flat board of 300 mm in length, 100 mm in width, and 1.5 mm in thickness was injection-molded into a test piece at an injection temperature of 230° C. and at a mold temperature of 50° C. The test piece was allowed to stand at a temperature of 23° C. for 24 hours, and measured with respect to size in the lengthwise direction. The molding shrinkage was calculated according to the following formula:

$$\frac{(\text{mold size} - \text{molding size})}{\text{mold size}} \times 100$$

(d) Solvent Resistance

A flat board of 300 mm in length, 100 mm in width, and 1.5 mm in thickness was injection-molded into a test piece at an injection temperature of 230° C. and at a mold temperature of 50° C. The test piece was immersed in ethyl acetate at 23° C. for 5 hours. Thereafter, it was picked up, and examined with respect to swollen state, followed by judgement according to the following criteria:

◎: no change recognizable at all
○: no substantial change recognizable
△: slight change recognizable to a practically usable extent
x: marked change recognizable to a practically useless extent (e) Delamination Interlayer Cleavage:

A sheet of 1.5 mm in thickness was prepared by extruding a molten resin from a T die extruder having an opening diameter of 65 mm and set at an extrusion temperature of 230° C. and at a roll temperature of 80° C. into between two metal rolls. Peeling test pieces of 10 mm in width and 100 mm in length in the hauling-off direction were cut from the sheet obtained. A slit of about 20 mm in the lengthwise direction was formed all over the width of 10 mm and substantially at the central portion of the cross section having a thickness of 1.5 mm with a knife. Two portions of 0.75 mm in thickness, 10 mm in width, and 20 mm in length formed by the slit were pulled in mutually opposite directions to examine the extent of cleavage in the remaining portion of about 80 mm in length, followed by judgement according to the following criteria:

○: not peeled at all
△: partially peeled and broken midway
x: easily peeled to the last (f) Degree of Surface Treatment In accordance with JIS K 6768.

(g) Tensile Test

Two kinds of test pieces No. 2 as specified in JIS K 6758 were molded by the injection molding method, and examined in accordance with JIS K 6758. One kind of test piece No. 2 had a resin joint portion in the middle thereof, while the other had no resin joint portion. The tensile strength of a weld was measured using the test piece having the resin joint portion, while the usual tensile strength was measured using the test piece having no resin joint portion. As the tensile strength of the weld is lower as compared with the usual tensile strength, the compabitility is poorer.

EXAMPLES 1 to 9 and COMPARATIVE EXAMPLES 1 to 7

A propylene-ethylene block copolymer (Chisso Polypro K 7019) having a melt flow rate of 9.0 g/10 min. and an ethylene unit content of 8.0 wt. % was used as the polypropylene type resin in Examples 1 to 8, while a propylene homopolymer (Chisso Polypro K 1008) having a melt flow rate of 10 g/10 min. was used in Example 9. Polystyrene, Dialex HF 77 (melt index: 7.5 g/10 min.) manufactured by Mitsubishi Monsanto Chemical Co., was used as the styrene type resin in Examples 1 to 6 and 9, while an ABS resin, Tuflex 710 (melt index: 8.0 g/10 min.) manufactured by Mitsubhishi Monsanto Chemical Co., was used in Examples 7 and 8. Arkon P-125 manufactured by Arakawa Chemical Industries, LTD. was used as the petroleum resin in Examples 1 to 9. The blending components were mixed by stirring in a Henschel mixer (trade name) at a blending proportion as listed in Table 1 given later for 10 minutes. The resulting mixture was molten, kneaded, and extruded into pellets in an extruder having an opening diameter of 65 mm at a melt kneading temperature of 230° C.

In Comparative Examples 1 to 7, Chisso Polypro K 7019 as used in Examples 1 to 8 was used as the polypropylene type resin. No styrene type resin was used in Comparative Example 1, while Dialex HF 77 as used in Examples 1 to 6 and 9 and manufactured by Mitsubishi Monsanto Chemical Co. was used as the styrene type resin in Comparative examples 2 to 7. No petroleum resin was used in Comparative Examples 1, 2, 4 and 6, while Arkon P-125 as used in Examples 1 to 9 and manufactured by Arakawa Chemical Industries, LTD. was used as the petroleum resin in Comparative Examples 3, 5 and 7. The blending components were mixed by stirring at a blending proportion as listed in Table 1 given later, and were molten, kneaded, and extruded into pellets in the same manner as in Examples 1 to 9. Using pellets obtained in each of Examples and Comparative Examples, there were prepared a molding product for evaluation for adhesion thereof to a foamed polyurethane, test pieces for examination of molding shrinkage and solvent resistance, a test piece for examination of delamination, and test pieces (two kinds) for tensile test. These tests were conducted. In the case of treating a bonding surface prior to the test for evaluation for adhesion to a foamed polyurethane, the flame treatment method using a propane gas burner was employed as the surface treatment method. These results are summarized in Table 1.

TABLE 1

| | Resin Composition (Blending Proportion, wt. %) | | | | | Extent of Surface Treatment (dyne/cm) | Test Results | | | | | |
|---|---|---|---|---|---|---|---|---|---|---|---|---|
| | Polypropylene Type Resin | | Styrene type resin | | Petroleum Resin | | Adhesion to Foamed Poly- urethane | Solvent Resis- tance | Delam- ination | Molding Shrink- age (%) | Tensile Strength (Kg/cm²) | Tensile Strength of Weld (Kg/cm²) |
| | Chisso Polypro K 7019 | Chisso Polypro K 1008 | Dialex HF 77 | Tuflex 710 | Arkon P-125 | | | | | | | |
| Ex. - 1 | 83 | — | 15 | — | 2 | 40 | ○ | ◎ | ○ | 1.40 | 285 | 240 |
| Ex. - 2 | 73 | — | 25 | — | 2 | 40 | ◎ | ○ | ○ | 1.27 | 293 | 215 |
| Ex. - 3 | 73 | — | 25 | — | 2 | not treated | ○ | ○ | ○ | 1.27 | 291 | 210 |
| Ex. - 4 | 71 | — | 25 | — | 4 | 40 | ◎ | ○ | ○ | 1.25 | 295 | 223 |
| Ex. - 5 | 63 | — | 35 | — | 2 | 40 | ◎ | △ | △ | 1.15 | 303 | 196 |
| Ex. - 6 | 63 | — | 35 | — | 2 | not treated | ○ | △ | △ | 1.15 | 300 | 195 |
| Ex. - 7 | 73 | — | — | 25 | 2 | 40 | ◎ | ◎ | ○ | 1.36 | 287 | 208 |
| Ex. - 8 | 63 | — | — | 35 | 2 | 40 | ◎ | ○ | ○ | 1.26 | 298 | 188 |
| Ex. - 9 | — | 73 | 25 | — | 2 | 40 | ◎ | ○ | ○ | 1.35 | 365 | 325 |
| Com. ex. - 1 | 100 | — | — | — | — | 40 | X | ◎ | ○ | 1.65 | 276 | 262 |
| Com. ex. - 2 | 95 | — | 5 | — | — | 40 | X | ◎ | ○ | 1.58 | 278 | 195 |
| Com. ex. - 3 | 93 | — | 5 | — | 2 | 40 | X | ◎ | ○ | 1.55 | 283 | 253 |
| Com. ex. - 4 | 50 | — | 50 | — | — | 40 | ◎ | X | X | 0.98 | 330 | 45 |
| Com. ex. - 5 | 48 | — | 50 | — | 2 | 40 | ◎ | X | X | 0.96 | 324 | 103 |
| Com. ex. - 6 | 75 | — | 25 | — | — | 40 | △ | ○ | X | 1.32 | 287 | 94 |
| Com. ex. - 7 | 65 | — | 25 | — | 10 | 40 | ◎ | X | ○ | 1.20 | 299 | 197 |

As is apparent from Table 1, molding products formed from a composition according to the present invention in Examples 1 to 9 have an excellent adhesion to the foamed polyurethane and a molding shrinkage lower than that of the molding product formed from only the polypropylene type resin in Comparative Example 1, and were on a level presenting no practical problem with respect to solvent resistance, delamination, tensile strength, and tensile strength of weld. A molding product formed using the styrene type resin in an amount below the lower limit specified in the present invention without using the petroleum resin in Comparative Example 2 had a poor adhesion to a foamed polyurethane and an insufficiently improved molding shrinkage. A molding product formed using the petroleum resin in an amount within the composition range specified in the present invention and the styrene type resin in an amount below the lower limit specified in the present invention in Comparative Example 3 had a poor adhesion to a foamed polyurethane and an insufficiently improved molding shrinkage. Molding products formed from a composition comprising the styrene type resin in an amount of 50 wt. % exceeding the upper limit of the composition range specified in the present invention in Comparative Examples 4 and 5 involved defects of poor solvent resistance and a liability to delamination, which were understood to make it unsuitable in practical use, though it was excellent in adhesion to the foamed polyurethane and molding shrinkage. It was found that a molding product formed from a composition comprising the petroleum resin in an amount of 10 wt. % exceeding the composition range specified in the present invention in Comparative Example 7 was notably downgraded in solvent resistance to make itself practically useless.

EXAMPLES 10 to 20 and COMPARATIVE EXAMPLES 8 to 14

Chisso Polypro K 7019 as used in Examples 1 to 8 was used as the polypropylene type resin, while Dialex HF 77 manufactured by Mitsubishi Monsanto Chemical Co. was used as the styrene type resin. The filler used was calcium carbonate of 2 μm in particle size in Examples 10 to 17, talc of 2 μm in average particle size in Example 18, and wooden powder, which had passed through a 80-mesh sieve, in Examples 19 and 20. The blending components were mixed at a blending proportion as listed in Table 2 given later in the same manner as in Examples 1 to 9, and were molten, kneaded, and extruded into pellets in the same manner as in Examples 1 to 9.

In Comparative Examples 8 to 14, the blending components were mixed at a blending proportion as listed in Table 2 given later in the same manner as in Examples 1 to 9, and were molten, kneaded, and extruded into pellets in the same manner as in Examples 1 to 9.

Using pellets obtained in each of Examples and Comparative Examples there were prepared a molding product for evaluation for adhesion thereof to a foamed polyurethane, test pieces for evaluation for molding shrinkage and solvent resistance, a test piece for evaluation for delamination, and test pieces (two kinds) for a tensile test. These tests were conducted. In the case of treating a bonding surface prior to the test for evaluation for adhesion to a foamed polyurethane, the flame treatment method using a propane gas burner was employed as the surface treatment method. These results are summarized in Table 2.

TABLE 2

| | Resin Composition (Blending Proportion, wt. %) | | | Filler | | | Extent of Surface Treatment (dyne/cm) | Test Results | | | | | |
|---|---|---|---|---|---|---|---|---|---|---|---|---|---|
| | Chisso Polypro K 7019 | Dialex HF 77 | Arkon P-125 | Calcium Carbonate | Talc | Wooden powder | | Adhesion to Foamed Polyurethane | Solvent Resistance | Delamination | Molding Shrinkage (%) | Tensile Strength (Kg/cm²) | Tensile Strength of Weld (Kg/cm²) |
| Ex.-10 | 73 | 15 | 2 | 10 | — | — | 40 | ◉ | ◉ | ○ | 1.25 | 299 | 215 |
| Ex.-11 | 63 | 25 | 2 | 10 | — | — | 40 | ◉ | ◉ | ○ | 1.18 | 306 | 203 |
| Ex.-12 | 53 | 35 | 2 | 10 | — | — | 40 | ◉ | ○ | ○ | 1.08 | 321 | 174 |
| Ex.-13 | 53 | 25 | 2 | 20 | — | — | 40 | ◉ | ◉ | ○ | 0.75 | 335 | 186 |
| Ex.-14 | 53 | 25 | 2 | 20 | — | — | not treated | ◉ | ◉ | ○ | 0.76 | 331 | 190 |
| Ex.-15 | 43 | 25 | 2 | 30 | — | — | 40 | ◉ | ◉ | ○ | 0.68 | 344 | 169 |
| Ex.-16 | 54 | 25 | 1 | 20 | — | — | 40 | ◉ | ◉ | ○ | 0.78 | 328 | 175 |
| Ex.-17 | 51 | 25 | 4 | 20 | — | — | 40 | ◉ | ○ | ○ | 0.71 | 339 | 197 |
| Ex.-18 | 53 | 25 | 2 | — | 20 | — | 40 | ◉ | ◉ | ○ | 0.70 | 348 | 173 |
| Ex.-19 | 53 | 25 | 2 | — | — | 20 | 40 | ◉ | ○ | ○ | 0.65 | 322 | 160 |
| Ex.-20 | 53 | 25 | 2 | — | — | 20 | not treated | ◉ | ○ | ○ | 0.67 | 317 | 163 |
| Com. ex.-8 | 75 | — | — | 25 | — | — | 40 | X | ◉ | ○ | 1.27 | 315 | 149 |
| Com. ex.-9 | 75 | — | — | — | — | 25 | 40 | X | ◉ | ○ | 1.13 | 310 | 124 |
| Com. ex.-10 | 73 | 5 | 2 | 20 | — | — | 40 | X | ◉ | ○ | 1.25 | 312 | 137 |
| Com. ex.-11 | 33 | 45 | 2 | 20 | — | — | 40 | ◉ | X | X | 0.69 | 363 | 78 |
| Com. ex.-12 | 23 | 25 | 2 | 50 | — | — | 40 | △ | △ | ○ | 0.67 | 385 | 63 |
| Com. ex.-13 | 54.9 | 25 | 0.1 | 20 | — | — | 40 | ◉ | ◉ | ○ | 0.80 | 327 | 45 |
| Com. ex.-14 | 45 | 25 | 10 | 20 | — | — | 40 | ◉ | X | ○ | 0.67 | 344 | 128 |

As can be understood from Table 2, all molding products formed using a filler-containing composition according to the present invention in Examples had an excellent adhesion to a foamed polyurethane and an improved molding shrinkage. It can be understood that filler blending further improves the adhesion to a foamed polyurethane and the molding shrinkage with substantially the same effectiveness being attained by either an inorganic filler or an organic filler. As for the adhesion to a foamed polyurethane, it is understood that a good adhesion is attained even when a molding product is not surface-treated.

In contrast, it can be understood that molding products formed using a composition out of the composition range specified in the present invention in Comparative Examples is not practically usable because they involves any problem with respect to adhesion to a foamed polyurethane solvent resistance, delamination, and tensile strength of weld.

EXAMPLES 21 to 24 and COMPARATIVE EXAMPLES 15 to 17

Chisso Polypro K 7019 as used in Examples 1 to 8 was used as the polypropylene type resin, while Dialex HF 77 manufactured by Mitsubishi Monsanto Chemical Co. and as used in Examples 1 to 6 was used as the styrene type resin. Rosin glyceride (called "ester gum") was used as the derivative of rosin. The blending components were mixed at a blending proportion as listed in Table 3 given later in the same manner as in Examples 1 to 9, and were molten, kneaded, and extruded into pellets in the same manner as in Examples 1 to 9.

In Comparative Examples 15 to 17, the blending components were mixed at a blending proportion as listed in Table 3 given later in the same manner as in Examples 1 to 9, and were molten, kneaded, and extruded into pellets in the same manner as in Examples 1 to 9.

Using pellets obtained in each of Examples and Comparative Examples, there were prepared a molding product for evaluation for adhesion thereof to a foamed polyurethane, test pieces for evaluation for molding shrinkage and solvent resistance, a test piece for evaluation for delamination, and test pieces (two kinds) for a tensile test. These tests were conducted. In the case of treating a bonding surface prior to the test for evaluation for adhesion to a foamed polyurethane, the flame treatment method using a propane gas burner was employed as the surface treatment method. These results are summarized in Table 3.

TABLE 3

| | Blending Proportion (wt. %) | | | Extent of Surface Treatment (dyne/cm) | Test Results | | | | | |
|---|---|---|---|---|---|---|---|---|---|---|
| | Chisso Polypro K 7019 | Dialex HF 77 | Ester Gum | | Adhesion to Foamed Polyurethane | Solvent Resistance | Delamination | Molding Shrinkage (%) | Tensile Strength (Kg/cm²) | Tensile Strength of Weld (Kg/cm²) |
| Ex. 21 | 83 | 15 | 2 | 40 | ○ | ◉ | ○ | 1.42 | 288 | 236 |
| Ex. 22 | 73 | 25 | 2 | 40 | ◉ | ○ | ○ | 1.30 | 295 | 208 |
| Ex. 23 | 73 | 25 | 2 | not treated | ○ | ○ | ○ | 1.31 | 294 | 206 |
| Ex. 24 | 71 | 25 | 4 | 40 | ◉ | ○ | ○ | 1.27 | 300 | 214 |
| Com. ex. 15 | 93 | 5 | 2 | 40 | X | ◉ | ○ | 1.58 | 284 | 245 |

TABLE 3-continued

| | Blending Proportion (wt. %) | | | Extent of Surface Treatment (dyne/cm) | Test Results | | | | | |
|---|---|---|---|---|---|---|---|---|---|---|
| | Chisso Polypro K 7019 | Dialex HF 77 | Ester Gum | | Adhesion to Foamed Polyurethane | Solvent Resistance | Delamination | Molding Shrinkage (%) | Tensile Strength (Kg/cm$^2$) | Tensile Strength of Weld (Kg/cm$^2$) |
| Com. ex. 16 | 48 | 50 | 2 | 40 | ◉ | X | X | 1.00 | 326 | 88 |
| Com. ex. 17 | 68 | 25 | 7 | 40 | ◉ | X | O | 1.31 | 299 | 192 |

As is apparent from Table 3, even if ester gum is used as the derivative of rosin, so long as it is used within the composition range specified in the present invention, a molding product not involving any problem in practical use is provided. Since it is good in the adhesion to a foamed polyurethane, molding shrinkage, solvent resistance, delamination, tensile strength, and tensile strength of weld portion.

EXAMPLES 25 to 29 and COMPARATIVE EXAMPLES 18 to 21

As a polyethylene type resin, polyethylene (Chisso Polyechi M 690) having a melt index of 13 g/10 min. and a number of branched methyl groups per 1,000 carbon atoms of 4.0, was used as the polyolefin resin, while Dialex HF 77 manufactured by Mitsubishi Monsanto Chemical Co. and as used in Examples 1 to 6 was used as the styrene type resin. Arkon P-125 manufactured by Arakawa Chemical Industrial, LTD. and as used in Examples 1 to 6 was used as the petroleum resin. The blending components were mixed at a blending proportion as listed in Table 4 given later in the same manner as in Examples 1 to 9, and were molten, kneaded, and extruded into pellets in the same manner as in Examples 1 to 9.

In Comparative Examples 18 to 19, the blending components were mixed at a blending proportion as listed in Table 4 given later in the same manner as in Examples 1 to 9, and were molten, kneaded, and extruded into pellets in the same manner as in Examples 1 to 9.

Using pellets obtained in each of Examples and Comparative Examples, there were prepared a molding product for evaluation for adhesion thereof to a foamed polyurethane, test pieces for evaluation for molding shrinkage and solvent resistance, a test piece for evaluation for delamination, and test pieces (two kinds) for a tensile test. These tests were conducted. In the case of treating a bonding surface prior to the test for evaluation for adhesion to a foamed polyurethane, the flame treatment method using a propane gas burner was employed as the surface treatment method. These results are listed in Table 4.

TABLE 4

| | Blending Proportion (wt. %) | | | Extent of Surface Treatment (dyne/cm) | Text Results | | | | | |
|---|---|---|---|---|---|---|---|---|---|---|
| | Chisso Polyechi M 690 | Dialex HF 77 | Arkon P-125 | | Adhesion to Foamed Polyurethane | Solvent Resistance | Delamination | Molding Shrinkage (%) | Tensile Strength (Kg/cm$^2$) | Tensile Strength of Weld (Kg/cm$^2$) |
| Ex. 25 | 83 | 15 | 2 | 40 | O | ◉ | O | 1.98 | 278 | 222 |
| Ex. 26 | 73 | 25 | 2 | 40 | ◉ | O | O | 1.85 | 286 | 198 |
| Ex. 27 | 73 | 25 | 2 | not treated | O | O | O | 1.86 | 284 | 199 |
| Ex. 28 | 71 | 25 | 4 | 40 | ◉ | O | O | 1.83 | 285 | 207 |
| Ex. 29 | 63 | 35 | 2 | 40 | ◉ | Δ | O | 1.74 | 291 | 175 |
| Com. ex. 18 | 100 | — | — | 40 | X | ◉ | O | 2.20 | 270 | 225 |
| Com. ex. 19 | 93 | 5 | 2 | 40 | X | ◉ | O | 2.16 | 273 | 209 |
| Com. ex. 20 | 48 | 50 | 2 | 40 | ◉ | X | X | 1.60 | 318 | 93 |
| Com. ex. 21 | 68 | 25 | 7 | 40 | ◉ | X | O | 1.79 | 290 | 174 |

Even by using polyethylene as the polyolefin resin, a composition according to the present invention provides a molding product involving no problems in practical use since it is good in adhesion to a foamed polyurethane, molding shrinkage, solvent resistance, delamination, tensile strength, and tensile strength of weld.

As described above, a molding product using a composition according to the present invention has a very excellent adhesion to a cast foamed polyurethane and a low molding shrinkage, and involves no problems in practical use with respect to physical properties such as solvent resistance, delamination, tensile strength, and tensile strength of weld. Thus, it has been found that the composition of the present invention can be suitably used as the molding material in various molding methods such as the injection molding method, the extrusion molding method, and the blow molding method for production of various molding product including parts of household electric appliances and automotive parts.

What is claimed is:

1. A polyolefin resin composition suitable for forming a molded product with superior adhesion to a cast foamed polyurethane but with little molding shrinkage, which composition comprises a blend of
(1) a polyolefin resin selected from the group consisting of
   (i) a propylene homopolymer,
   (ii) a crystalline copolymer comprising propylene units as the main component and units of one or more alpha-olefins selected from the group consisting of ethylene, butene-1, 4-methylpentene-1, hexene-1, heptene-1, octene-1 and decene-1, (iii) an ethylene homopolymer or a crystalline copolymer comprising ethylene units as the main component and units of one or more alpha-olefin selected from the group consisting of propylene, butene-1, 4-methylpentene-1 hexene-1, heptene-1, octene-1 and decene-1 or a mixture thereof, (2) 10 to 40 wt. % of a styrene resin selected from the group consisting of
   (i) a polystyrene,
   (ii) an acrylonitrile-butadiene-styrene copolymer,
   (iii) an acrylonitrile-styrene copolymer,
   (iv) a styrene-methylmethacrylate copolymer,
   (v) a styrene-maleic anhydride copolymer and a mixture thereof; and (3) 0.5 to 5 wt. % of at least one member selected from the group consisting of rosin, derivatives of rosin and petroleum resin, said percentages being by weight of the polyolefin resin composition.

2. A polyolefin resin composition as claimed in claim 1 wherein said styrene resin accounts for 15 to 35 wt. %, while said one or more members selected from the group consisting of derivatives of rosin, and petroleum resins accounts for 2 to 4 wt. %: said percentage being by weight of the polyolefin resin composition.

3. A polyolefin resin composition as claimed in claim 1, wherein said poloyolefin resin is a propylene homopolymer; a crystalline propylene-ethylene block copolymer, a crystalline propylene-ethylene random copolymer or a crystalline propylene-ethylene-butene-1 terpolymer, which crystalline copolymers and terpolymer each contain propylene units as the main component; an ethylene homopolymer; a crystalline ethylene-propylene copolymer, a crystalline ethylene-butene-1 copolymer or a crystalline ethylene-hexene-1 copolymer, which crystalline copolymers each contain ethylene units as the main component; or a mixture thereof.

4. A polyolefin resin composition for forming a molded product with superior adhesion to a cast foamed polyurethane but with little molding shrinkage; which comprises a blend of
(1) a polyolefin resin selected from the group consisting of a
   (i) propylene homopolymer,
   (ii) a crystalline copolymer comprising propylene units as the main component and units of one or more alpha-olefins selected from the group consisting of ethylene, butene-1, 4-methylpenene-1, hexene-1,heptene-1, octene-1 and decene-1,
   (iii) an ethylene homopolymer or a crystalline copolymer comprising ethylene units as the main component and units of one or more alpha-olefins selected from the group consisting of propylene, butene-1,4-methylpentene-1, hexene-1, heptene-1, octene-1, and decene-1, and mixtures thereof;

(2) 10 to 40 wt. % of a styrene resin selected from the group consisting of
   (i) polystyrene,
   (ii) an acrylonitrile-butadiene-styrene copolymer,
   (iii) an acrylonitrile-styrene copolymer,
   (iv) a styrene methylmethacrylate copolymer, and
   (v) a styrene-maleic anhydride copolymer and a mixture thereof, (3) 0.5 to 5 wt. % of at least one member selected from the group consisting of rosin, derivatives of rosin and a petroleum resin, (4) 5 to 40 wt. % of a filler, said percentages being by weight of the polyolefin resin composition.

5. A polyolefin resin composition as claimed in claim 4 wherein said styrene resin accounts for 15 to 25 wt. % while said one or more members selected from the group consisting of rosin, derivatives of rosin, and petroleum resins accounts for 1 to 4 wt. % and said filler accounts for 10 to 35 wt. %, said percentages being the weight of the polyolefin resin composition.

6. A polyolefin resin composition as claimed in claim 4 wherein said polyolefin resin is a propylene homopolymer; a crystalline propylene-ethylene block copolymer, a crystalline propylene-ethylene random copolymer or a crystalline propylene-ethylene-butene-1 terpolymer, which crystalline copolymers and terpolymer each contain propylene units as the main component; an ethylene homopolymer, a crystalline ethylene-propylene copolymer, a crystalline ethylene-butene-1 copolymer or a crystalline ethylene-hexene-1 copolymer, which crystalline copolymers each contain ethylene units as the main component, or a mixture thereof.

7. A polyolefin resin composition as claimed in claim 4 wherein said filler is talc, calcium carbonate, barium sulfate, calcium silicate, calcium sulfate, aluminum hydroxide, magnesium hydroxide, mica, a metal powder, a metal fiber, a wooden powder, a chaff powder, a cellulose staple fiber, a synthetic staple fiber, or a mixture thereof.

8. Composite shaped articles comprising a cast foamed polyurethane shaped part and adhered therewith, a shaped part of the polyolefin resin composition according to claim 1.

9. Composite shaped articles comprising a cast foamed polyurethane shaped part and adhered therewith a shaped part of the polyolefin resin composition according to claim 4.

* * * * *